US008237817B2

(12) United States Patent
Nakatani

(10) Patent No.: US 8,237,817 B2
(45) Date of Patent: Aug. 7, 2012

(54) IMAGING DEVICE, IMAGING DEVICE CONTROL METHOD AND PROGRAM FOR IMAGING DEVICE CONTROL METHOD

(75) Inventor: Masaya Nakatani, Tokyo (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 12/439,216

(22) PCT Filed: Jul. 12, 2007

(86) PCT No.: PCT/JP2007/064296
§ 371 (c)(1),
(2), (4) Date: Feb. 27, 2009

(87) PCT Pub. No.: WO2008/026398
PCT Pub. Date: Mar. 6, 2008

(65) Prior Publication Data
US 2009/0251568 A1    Oct. 8, 2009

(30) Foreign Application Priority Data

Aug. 31, 2006  (JP) ................. P2006-234750

(51) Int. Cl.
| H04N 9/68 | (2006.01) |
| H04N 5/235 | (2006.01) |
| H04N 5/222 | (2006.01) |
| G03B 7/00 | (2006.01) |
| G06K 9/34 | (2006.01) |
| G06K 9/00 | (2006.01) |
| G06T 11/20 | (2006.01) |
| G09G 5/22 | (2006.01) |

(52) U.S. Cl. ................. 348/234; 348/222.1; 348/229.1; 348/333.01; 348/333.11; 348/362; 382/164; 345/440; 345/440.2

(58) Field of Classification Search ........................ None
See application file for complete search history.

(56) References Cited

U.S. PATENT DOCUMENTS

| 5,012,333 A * | 4/1991 | Lee et al. ............... 358/520 |
| 7,986,355 B2 * | 7/2011 | Nozawa ................. 348/254 |
| 2002/0154829 A1 * | 10/2002 | Tsukioka ............... 382/254 |
| 2003/0122951 A1 * | 7/2003 | Hara et al. ............. 348/333.02 |
| 2004/0042791 A1 | 3/2004 | Suekane et al. |
| 2004/0125220 A1 | 7/2004 | Fukuda et al. |
| 2005/0030411 A1 * | 2/2005 | Aoyagi et al. ........... 348/362 |
| 2006/0044459 A1 * | 3/2006 | Kato ..................... 348/362 |

FOREIGN PATENT DOCUMENTS

| JP | 2001 245204 | 9/2001 |
| JP | 2003 333378 | 11/2003 |
| JP | 2004 194109 | 7/2004 |
| JP | 2004 208028 | 7/2004 |
| JP | 2005 109740 | 4/2005 |

* cited by examiner

Primary Examiner — Aung S Moe
Assistant Examiner — Michael Osinski
(74) Attorney, Agent, or Firm — Frommer Lawrence & Haug LLP; William S. Frommer; Paul A. Levy

(57) ABSTRACT

The present invention is applicable to, for example, a camera-integrated video tape recorder, displaying a marker M so that a luminance level, converted into a specific pattern by zebra display, can be specified on a histogram 80.

8 Claims, 4 Drawing Sheets (A)

(B)

IMAGING DEVICE, IMAGING DEVICE CONTROL METHOD AND PROGRAM FOR IMAGING DEVICE CONTROL METHOD

BACKGROUND OF THE INVENTION

1. Technical Field

The present invention relates to an imaging device, imaging device control method and program for the imaging device control method and is applicable, for example, to a camera-integrated video tape recorder. The present invention effectively avoids user confusion by displaying a marker so that a luminance level, converted into a specific pattern by zebra display, can be specified on a histogram, thus providing the user with useful information resulting from simultaneous activation of histogram display and zebra display.

2. Background Art

Conventional imaging devices such as camera-integrated video tape recorder offer so-called zebra display, histogram display or other exposure control verification method.

Here, the zebra display is a method of showing the region with a specific luminance level by converting the specific luminance level into a specific pattern such as diagonal stripes in the display of a monitor image. The zebra display permits easy verification of properly exposed, overexposed and other regions on the monitor. More specifically, the zebra display makes it possible to control the exposure during the filming of a person so that the luminance level of the facial region is about 70[%], thus ensuring proper filming. Therefore, if the region with a luminance level of about 70[%] can be marked with diagonal stripes by the zebra display, proper exposure can be verified during the filming of a person. Further, if the region with a luminance level of 100[%] or above can be marked with diagonal stripes, the whited-out portion can be readily distinguished.

On the other hand, the histogram display is designed, for example, to tally the luminance level on a pixel-by-pixel basis and show a histogram of the tally result. The histogram display allows for easy verification of the luminance level distribution in the imaging result. That is, if the distribution is skewed toward higher luminance levels, one can determine that the picture is rather whited out as a whole. In contrast, if the distribution is skewed toward lower luminance levels, one can determine that the picture is rather blacked out as a whole.

Japanese Patent Laid-Open No. Hei 9-51472 proposes an exposure control method which determines the most distributed luminance level in the histogram to determine whether or not the picture is back-lit and which uses this determination result for exposure control.

Incidentally, simultaneous activation of the histogram display and zebra display can probably provide the user with significantly more exposure control information than if the histogram display and zebra display are activated independently from each other.

However, simple simultaneous activation of the histogram display and zebra display may, instead, confuse the user. If the user can be provided with useful information resulting from simultaneous activation of the histogram display and zebra display by avoiding such user confusion, ease of use for the user will probably improve further.

DISCLOSURE OF INVENTION

The present invention has been devised in light of the aforementioned problems, and it is an object of the present invention to propose an imaging device, imaging device control method and program for the imaging device control method which can provide the user with useful information resulting from simultaneous activation of the histogram display and zebra display by effectively avoiding user confusion.

In order to achieve the above object, the present invention is applied to an imaging device. The imaging device includes an imaging section, display section, luminance distribution detection section, luminance level determination section and control section. The imaging section obtains an imaging result. The display section displays a monitor image of the imaging result. The luminance distribution detection section detects the luminance distribution of the imaging result. The luminance level determination section determines the luminance levels of the imaging result. The control section displays, in the display section, a histogram showing the luminance distribution of the imaging result based on the detection result of the luminance level detection section in response to a user instruction. Further, the control section converts, based on the determination result of the luminance level determination section, the region with a specific luminance level in the imaging result into a specific pattern and displays the monitor image in the display section. The control section displays a marker so that the specific luminance level can be specified on the histogram.

Further, the present invention is applied to an imaging device control method for displaying, on a display section, an imaging result obtained by an imaging section. The control method includes a luminance distribution detection step, luminance level determination step and display step. The luminance distribution detection step detects the luminance distribution of the imaging result. The luminance level determination step determines the luminance levels of the imaging result. The display step displays, in the display section, a histogram showing the luminance distribution of the imaging result based on the detection result of the luminance level detection step in response to a user instruction. Further, the display step converts, based on the determination result of the luminance level determination step, the region with a specific luminance level in the imaging result into a specific pattern and displays the monitor image in the display section. The display step displays a marker so that the specific luminance level can be specified on the histogram.

Still further, the present invention is applied to a program for an imaging device control method for displaying, on a display section, an imaging result obtained by an imaging section. The control method includes a luminance distribution detection step, luminance level determination step and display step. The luminance distribution detection step detects the luminance distribution of the imaging result. The luminance level determination step determines the luminance levels of the imaging result. The display step displays, in the display section, a histogram showing the luminance distribution of the imaging result based on the detection result of the luminance level detection step in response to a user instruction. Further, the display step converts, based on the determination result of the luminance level determination step, the region with a specific luminance level in the imaging result into a specific pattern and displays the monitor image in the display section. The display step displays a marker so that the specific luminance level can be specified on the histogram.

According to the configuration of the present invention, a marker is displayed so that a specific luminance level can be specified on the histogram. As a result, not only can one determine whether the luminance distribution is skewed toward higher or lower luminance levels but also determine the skew and distribution of the luminance levels relative to the specific luminance level shown by the so-called zebra display. This makes it possible to provide the user with useful information resulting from simultaneous activation of the histogram display and zebra display as compared to simple simultaneous activation of the histogram display and zebra display. In addition, the display of the marker allows for association of the histogram display with the zebra display, effectively avoiding user confusion.

The present invention can avoid user confusion, thus providing the user with useful information resulting from simultaneous activation of the histogram display and zebra display.

BEST MODE FOR CARRYING OUT THE INVENTION

Figure 1:
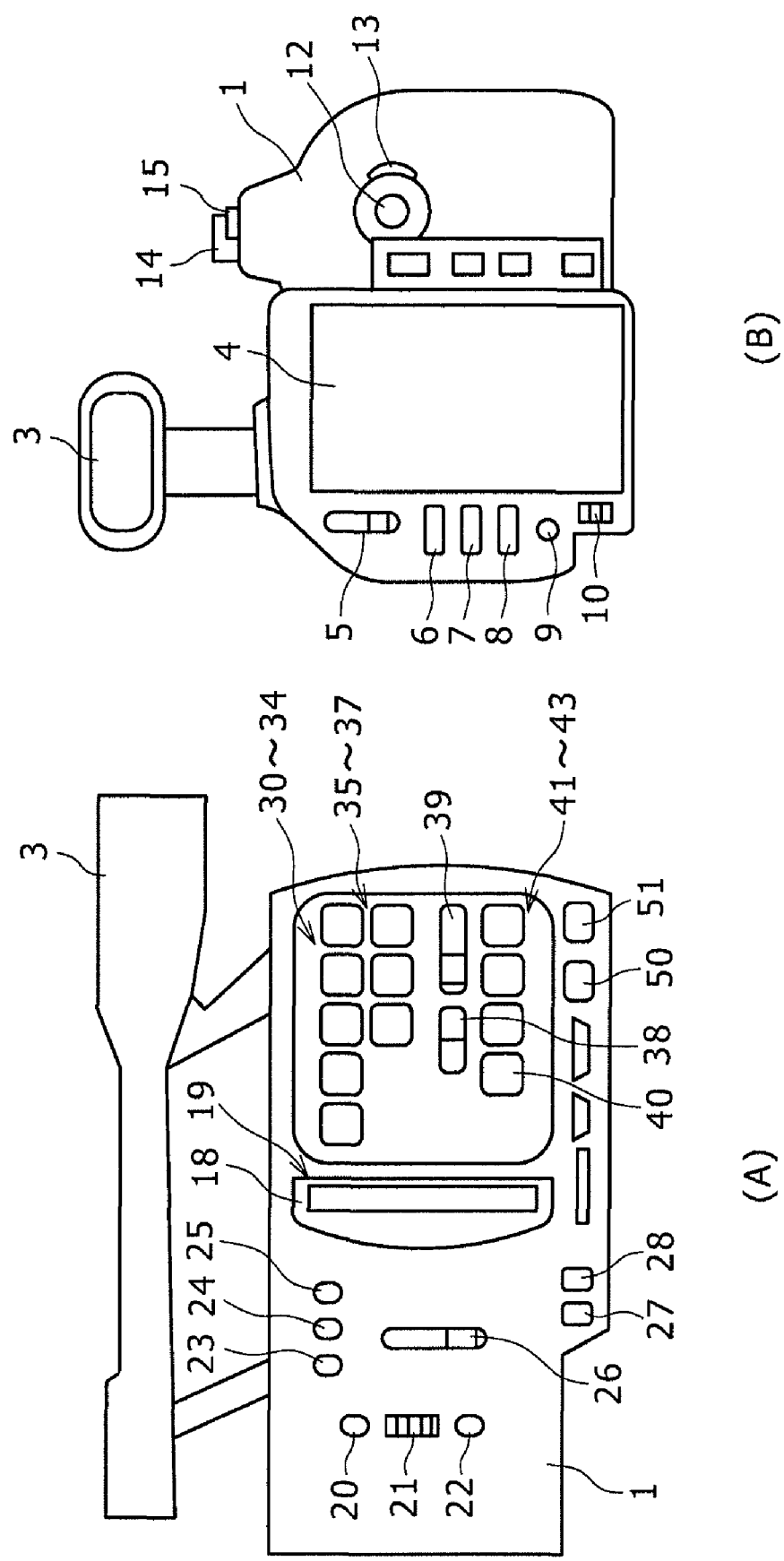
FIGS. 1(A) and 1(B) are front and side views of a camera-integrated video tape recorder according to embodiment 1 of the present invention.

The preferred embodiments of the present invention will be described in detail below with reference to the accompanying drawings as appropriate.

(1) Configuration of Embodiment 1

FIGS. 1(A) and 1(B) are side and rear views of a camera-integrated video tape recorder according to embodiment 1 of the present invention. It should be noted that this side view illustrates the video tape recorder with its lens removed therefrom. A camera-integrated video tape recorder 1 has an electronic viewfinder 3 provided on the top and a battery 4 held attachably and detachably on the rear. Further, the camera-integrated video tape recorder 1 has, on the rear, an operator 5 adapted to switch the camera setting between auto and manual, a gain adjustment operator 6, shutter speed setting operator 7 and white balance adjustment operator 8. It should be noted that the operators 6 to 8 are rendered operable when manual is selected by operating the operator 5. Further, the camera-integrated video tape recorder 1 has, on the rear, an operator 9 adapted to specify the display of a menu screen and a pressingly operable rotary operator 10 adapted to select a menu by moving a cursor on the menu screen. Still further, the same recorder 1 has, on the right side, a record start/stop operator 12, power operator 13, zooming operator 14 and an operator 15 adapted to specify still image recording.

Still further, the same recorder 1 has an openable/closable door 18 on the left side. A display section 19 for monitoring purposes is provided on the inside of the door 18. The display section 19 includes a liquid crystal display. Still further, the same recorder 1 has, on the left side, a camera manual operator 20, aperture operator 21, autofocus operator 22, various user setting operators 23 to 25, filter on/off operator 26, autofocus adjustment range switching operator 27 and focus adjustment operator 28 for manual operation. The camera manual operator 20 switches the optical system operation of the camera-integrated video tape recorder 1 to manual. The aperture operator 21 is used to manually operate the optical system aperture. Still further, the same recorder 1 has, on the portion covered with the door 18 in a closed position, stop, rewind, play, fast forward, slow and other operators 30 to 34, pause and record operators 35 to 37, volume control operator 38, so-called zebra display setting operator 39, operator 40 for the display in the display section 19 and various user setting operators 41 to 43. Still further, the same recorder 1 has, under the door 18, operators 50 and 51. The operator 50 is adapted to select an image quality adjustment profile. The operator 51 is adapted to allow for verification of various camera statuses.

Here, of the user setting operators 23 to 25, the operator 23 is adapted to increase or reduce the control target value for automatic exposure control. Therefore, the camera-integrated video tape recorder 1 is configured to permit the aperture control target value to be increased or reduced by operating the operator 23 when the optical system control of the same recorder 1 is set to auto by operating the operator 20. In contrast, the camera-integrated video tape recorder 1 is configured to permit the aperture value to be changed directly by operating the operator 21 when the optical system control of the same recorder 1 is set to manual by operating the operator 20.

On the other hand, the zebra display setting operator 39 is a slide switch adapted to select one of three choices of: stopping the zebra display; the zebra display which displays diagonal stripes in the region with a luminance level of 70[%]; and the zebra display which displays diagonal stripes in the region with a luminance level of 100[%] or above. Therefore, the camera-integrated video tape recorder 1 is configured to permit the zebra display to be activated on the monitor image shown in the display section 19 by operating the zebra display setting operator 39. In contrast, the camera-integrated video tape recorder 1 is configured to display a histogram on part of the monitor image when the monitor image is displayed in the display section 19 by selecting the histogram display menu on the menu screen which is displayed in the display section 19 by operating the operator 9.

Figure 2:
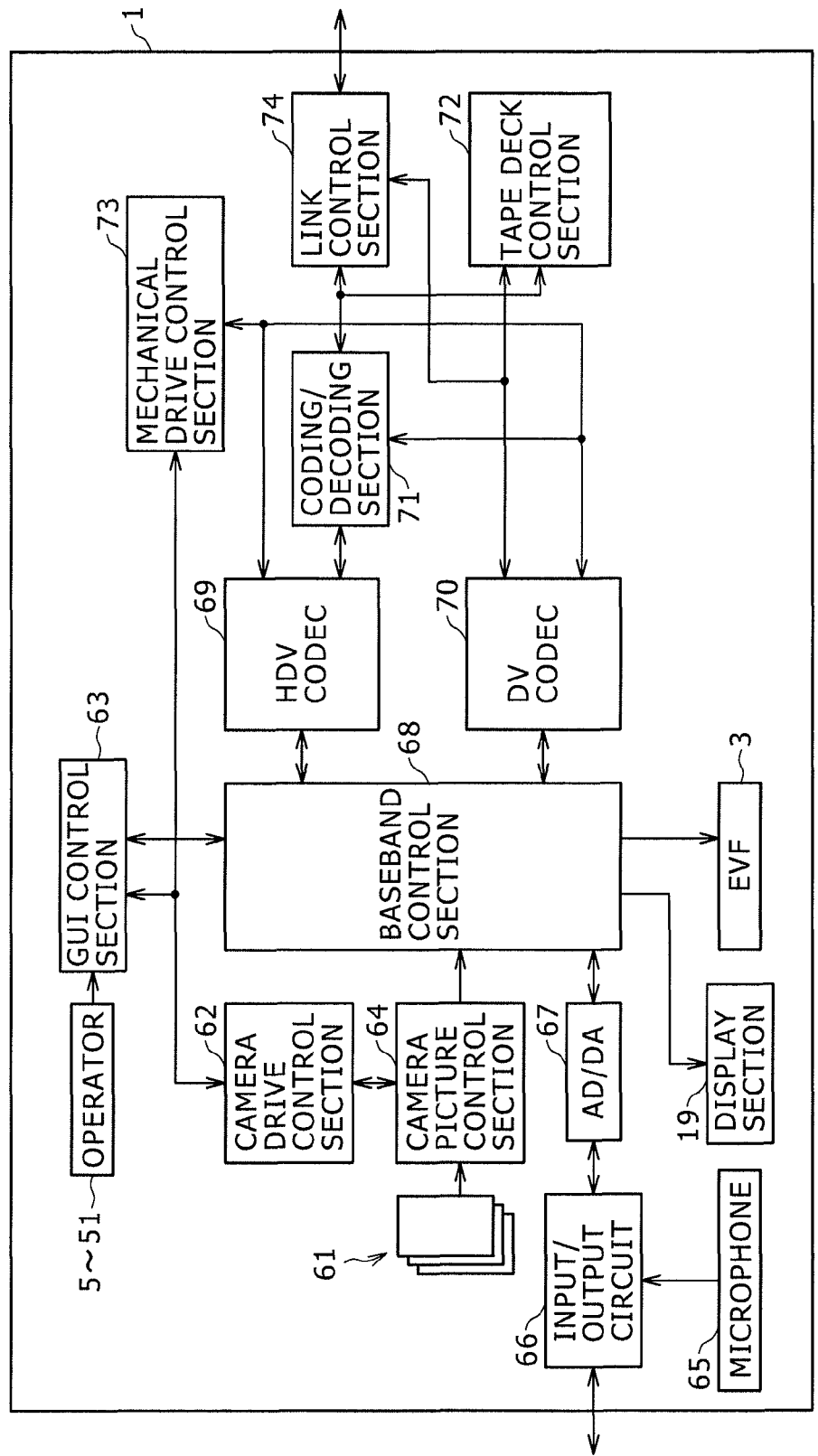
FIG. 2 is a block diagram illustrating the camera-integrated video tape recorder shown in FIG. 1.

FIG. 2 is a block diagram illustrating the camera-integrated video tape recorder 1. In the same recorder 1, an imaging element 61 is, for example, a CMOS (Complementary Metal-Oxide Semiconductor) sensor which converts the optical image, formed on the imaging surface by the optical system, into an electric signal and outputs the signal.

A camera drive control section 62 controls a camera picture control section 64 and the optical system according to control exercised by a GUI (Graphical User Interface) control section 63. That is, the camera picture control section 64 performs a weighted addition of the luminance level of video data produced by the camera picture control section 64 on a pixel-by-pixel basis to detect the brightness of the imaging result. It should be noted that the weighted addition on a pixel-by-pixel basis is a weighted addition appropriate for metering mode such as center-weighted side light. Further, the camera picture control section 64 evaluates the result of this weighted addition relative to a threshold value to determine the brightness of the imaging result and notifies the determination result to the GUI control section 63. It should be noted that this processing of the luminance level may be performed by finding, for example, the average luminance level on a given-region-by-given-region basis rather than on a pixel-by-pixel basis.

Further, the camera drive control section 62 changes the aperture in response to the operation of the operator 21 when the user operates the operator 20 to set the optical system control to manual. Still further, the camera drive control section 62 controls the optical system aperture so that the weighted addition result matches the control target value set by the operator 23 when the optical system control is set to auto exposure control by the user by operating the operator 20. It should be noted that the camera drive control section 62 changes not only the aperture value but also the shutter speed and video data gain in this auto exposure control.

The camera picture control section 64 processes the output signal of the imaging element 61 and outputs the video data of the imaging result to a baseband control section 68. The camera picture control section 64 tallies the luminance level of the imaging result on a pixel-by-pixel basis to detect the luminance distribution of the imaging result. It should be noted that this processing of the luminance level may also be performed by finding, for example, the average luminance level on a given-region-by-given-region basis rather than on a pixel-by-pixel basis. The camera picture control section 64 notifies this detection result to the GUI control section 63 via the camera drive control section 62.

A microphone 65 obtains an audio to be filmed and outputs an audio signal. An input/output circuit 66 amplifies the audio signal from the microphone 65 and outputs the signal. An AD/DA circuit 67 executes an analog digital converting circuit process on this analog audio signal from the input/output circuit 66 and outputs the audio data to the baseband control section 68. It should be noted that the camera-integrated video tape recorder 1 is configured to reproduce the video and audio signals recorded on a recording medium and output the reproduced signals to an external device. In this case, the AD/DA circuit 67 converts the audio data output from the baseband control section 68 into an analog signal and outputs the signal. The input/output circuit 66 outputs this analog signal to an external device.

The baseband control section 68 switches its operation according to control exercised by the GUI control section 63. During recording of the imaging result, the same section 68 processes the video data output from the camera picture control section 64 and the audio data output from the AD/DA circuit 67 and outputs the data to an HDV codec 69 or a tape deck control section 72. On the other hand, the monitor image of the imaging result is displayed in the display section 19 and an electronic viewfinder (EVF) 3. At this time, if instructed by the GUI control section 63 to activate the histogram display, the baseband control section 68 does so according to the instruction of the GUI control section 63.

Further, if the user specifies the zebra display by operating the operator 39, the baseband control section 68 sets, according to control exercised by the GUI control section 63, a threshold value serving as a determination criterion commensurate with the luminance level of the zebra display set with the operator 39. On the other hand, the camera drive control section 62 determines, based on this determination criterion, the luminance level of the video data, produced by the camera picture control section 64, on a pixel-by-pixel basis to detect the region to be indicated by the zebra display. It should be noted that two determination criteria, i.e., luminance levels of (70−2.5)[%] and (70+2.5)[%], are used here for the zebra display adapted to show diagonal stripes in the region with a luminance level of 70[%]. The baseband control section 68 activates the zebra display process by displaying a monitor image with the region, whose luminance level falls between the two determination criteria, converted into diagonal stripes. In contrast, the luminance level of 100[[%]] is used as a determination criterion for the zebra display adapted to show diagonal stripes in the region with a luminance level of 100[%] or above. The baseband control section 68 activates the zebra display process by displaying a monitor image with the region, whose luminance level is equal to or exceeds this criterion, converted into diagonal stripes.

Still further, the baseband control section 68 displays on screen various statuses specified by the GUI control section 63, with a monitor image displayed. Still further, the baseband control section 68 displays the menu screen in the display section 19 and electronic viewfinder 3 if instructed to display the menu screen by the GUI control section 63.

In contrast, when the imaging result is reproduced and monitored, video and audio data is obtained from the HDV codec 69 or tape deck control section 72. A monitor image of the obtained video data is displayed in the display section 19 and electronic viewfinder 3. Also in this case, the statuses specified by the GUI control section 63 are displayed on screen, with the monitor image displayed. Further, the menu screen is displayed.

When the imaging result is recorded in HDTV format, the HDV codec 69 converts the video data output from the baseband control section 68 into HDTV video data and outputs the data to the coding/decoding section 71 together with the audio data output from the baseband control section 68. In contrast, when the imaging result, recorded in HDTV format, is reproduced and monitored, the video and audio data output from the coding/decoding section 71 is received. The data is processed in reverse to the recording and output to the baseband control section 68.

When the imaging result is recorded in DV format, the DV codec 70 converts the video data output from the baseband control section 68 into video data in DV format and outputs the data to the tape deck control section 72 together with the audio data output from the baseband control section 68. In contrast, when the imaging result, recorded in DV format, is reproduced and monitored, the video and audio data output from the tape deck control section 72 is received. The data is processed in reverse to the recording and output to the baseband control section 68.

When the imaging result is recorded in HDTV format, the coding/decoding section 71 codes the video and audio data output from the HDV codec 69 and outputs the data to the tape deck control section 72. In contrast, when the imaging result, recorded in HDTV format, is reproduced and monitored, the bit stream output from the tape deck control section 72 is decoded into video and audio data and output to the HDV codec 69.

The tape deck control section 72 controls the magnetic tape running operation according to control exercised by the mechanical drive control section 73 to sequentially record the output data from the coding/decoding section 71 and DV codec 70 onto a magnetic tape. During the reproduction, the video and audio data from the magnetic tape is reproduced and output to the coding/decoding section 71 or DV codec 70.

In the camera-integrated video tape recorder 1, therefore, the imaging result obtained by the imaging element 61 is processed by the baseband control section 68. The imaging result is displayed in the display section 19 and electronic viewfinder 3, and the monitor image of the imaging result is displayed. Further, when this imaging result is recorded in HDTV format, the video and audio data output from the baseband control section 68 is sequentially processed by the HDV codec 69, coding/decoding section 71 and tape deck control section 72 and recorded onto a magnetic tape. Still further, when the imaging result is recorded in DV format, the video and audio data output from the baseband control section 68 is sequentially processed by the DV codec 70 and tape deck control section 72 and recorded onto a magnetic tape.

Further, when the imaging result, recorded in HDTV format on a magnetic tape, is reproduced and monitored, the magnetic tape output is sequentially processed by the tape deck control section 72, coding/decoding section 71 and HDV codec 69 to reproduce the original video and audio data. This reproduced video data is processed by the baseband control section 68 and displayed in the display section 19 and electronic viewfinder 3. Still further, when the imaging result is recorded in DV format, the magnetic tape output is sequentially processed by the tape deck control section 72 and DV codec 70 to reproduce the original video and audio data. This reproduced video data is processed by the baseband control section 68 and displayed in the display section 19 and electronic viewfinder 3.

The LINK control section 74 is an IEEE1394 input/output circuit. When an external device is connected to the LINK control section 74, the same section 74 establishes connection with the external device according to control exercised by the mechanical drive control section 73 to exchange various pieces of data. Further, the same section 74 inputs/outputs video and audio data to/from the external device and transmits and receives video and audio data, input/output to/from the external device, to and from the tape deck control section 72, coding/decoding section 71 and DV codec 70 in accordance with the format of inputting/outputting video data.

The mechanical drive control section 73 is a control circuit adapted to control the recording and reproduction system of the camera-integrated video tape recorder 1. The same section 73 controls the respective sections according to control exercised by the GUI control section 63.

The GUI control section 63 is arithmetic processing means adapted to execute the program recorded in a memory which is not shown. The same section 63 controls the operation of the camera-integrated video tape recorder 1 as a whole via the camera drive control section 62 and mechanical drive control section 73. In the camera-integrated video tape recorder 1, therefore, the program executed by the GUI control section 63 is supplied preinstalled in the same recorder 1. However, the program may instead be supplied recorded on an optical disk, magnetic disk, memory card or other recording medium or supplied through downloading via a network such as the Internet.

That is, the GUI control section 63 displays the menu screen in the display section 19 and electronic viewfinder 3 in response to the operation of the operator 9 and accepts settings of the respective sections made by the selection of menus on the menu screen. Here, the settings accepted on the menu screen are, for example, whether or not to activate the histogram display, whether to show or hide a marker in the histogram display, marker color, display of the control target value and so on.

In response, the GUI control section 63 obtains the imaging result through operation of the operator 13 and displays the monitor image in the display section 19 and electronic viewfinder 3. At this time, the same section 63 instructs the baseband control section 68 to activate the histogram display if instructed to activate the histogram display by the user by making the setting on the menu screen.

Figure 3:
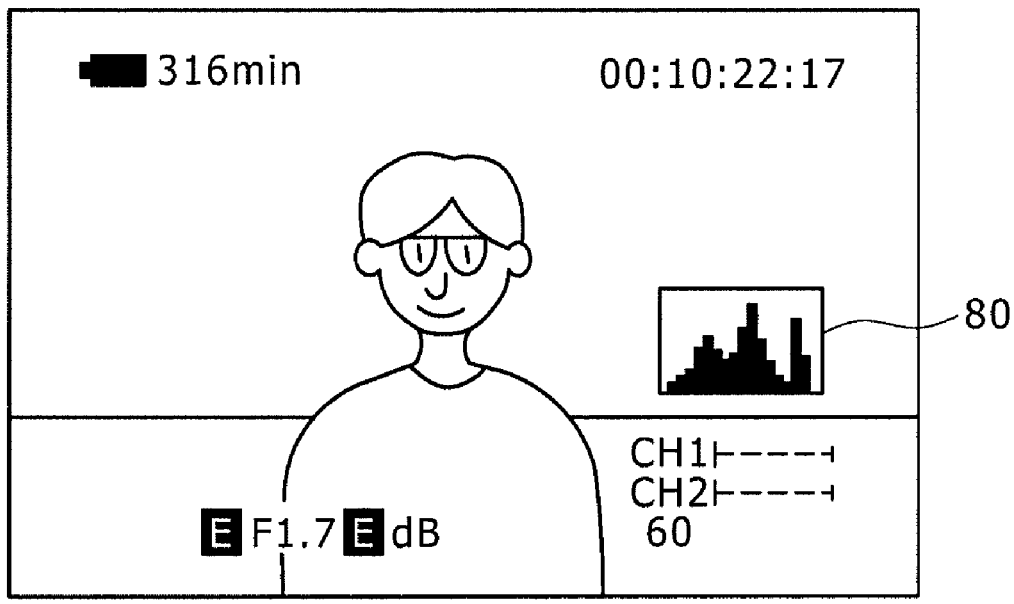
FIGS. 3(A) and 3(B) are plan views illustrating the display of the display section in the camera-integrated video tape recorder shown in FIG. 1.
Figure 3:
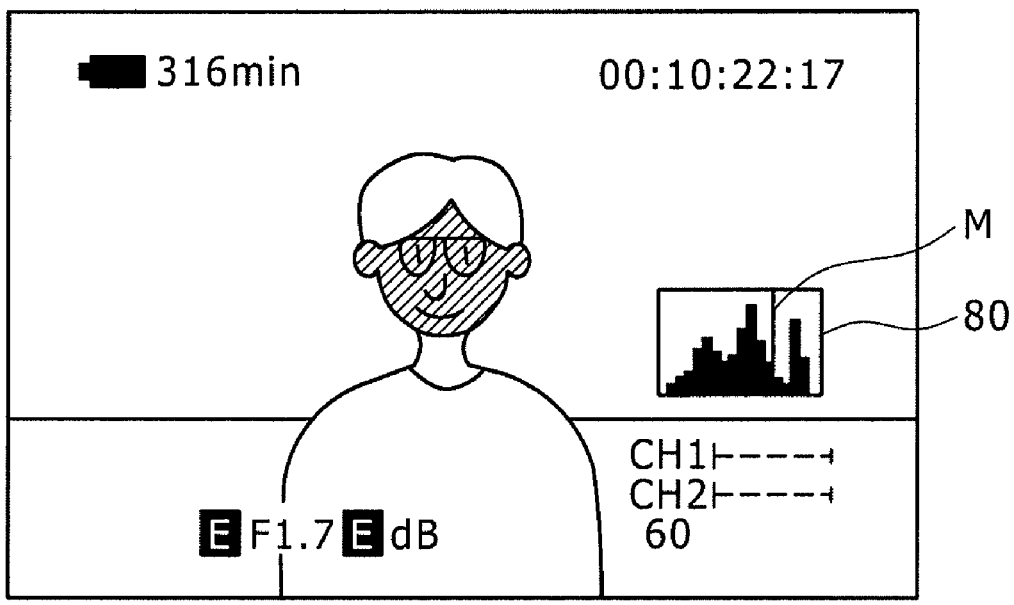

That is, in this case, the GUI control section 63 synthesizes images into a histogram whose luminance level is set on the horizontal axis based on the detection result of the luminance level distribution notified by the camera picture control section 64 via the camera drive control section 62 as illustrated in FIG. 3(A). The GUI control section 63 instructs the baseband control section 68 to display the histogram 80 on the monitor image. It should be noted that, in this FIG. 3(A), "316 min" is the remaining battery charge, and "00:10:22:17" the time code. Further, "CH1" and "CH2" are the signal level displays for audio data for channels 1 and 2, respectively.

The GUI control section 63 instructs the baseband control section 68 to activate the zebra display if instructed to do so by the user by operating the operator 39 when the monitor image of the imaging result, obtained by the imaging element 61, is displayed. At this time, when the histogram display is active in the display section 19 and electronic viewfinder 3 and if the display of a marker has been specified in advance by the user by making the setting on the menu screen, the GUI control section 63 displays a marker M in such a manner that the luminance level at which diagonal stripes are displayed by the zebra display can be specified on the histogram. More specifically, in the present embodiment, the marker M in a color different from the histogram 80 is formed with a line extending to the upper end of the histogram 80. It should be noted that the GUI control section 63 accepts the setting of the marker M color or the like on the menu screen.

Figure 4:
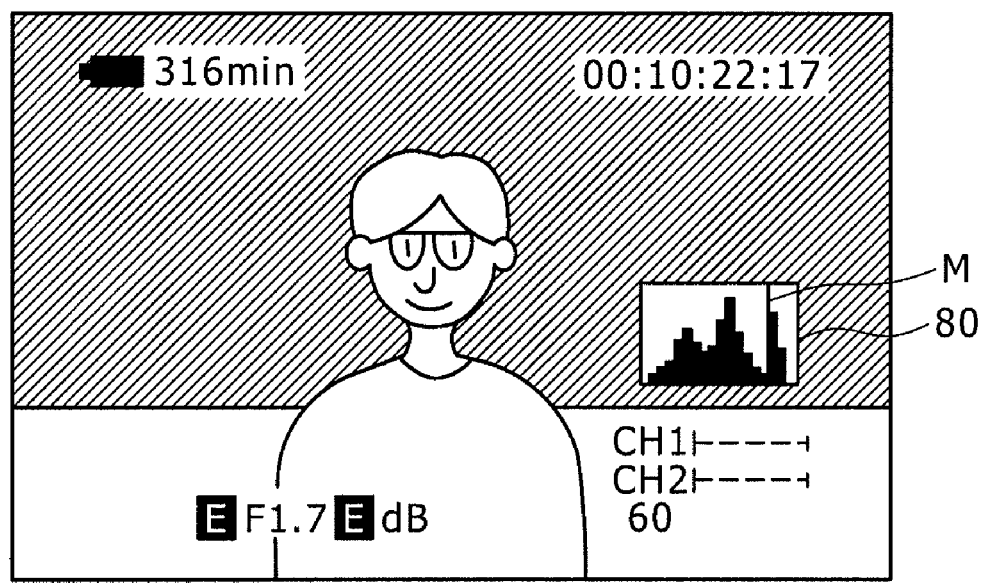
FIG. 4 is a plan view illustrating the display of a target value marker in the camera-integrated video tape recorder shown in FIG. 1.

That is, if the user specifies the zebra display for the luminance level of 70[%], the marker M will appear at the 70[%] luminance level position in the histogram 80 as illustrated in FIG. 3(B). In contrast, if the user specifies the zebra display for the luminance level of 100[%] or above, the marker M will appear at the 100[%] luminance level position in the histogram 80 as illustrated in FIG. 4.

On the other hand, if the display of a control target value is specified by the user and when the aperture is controlled by automatic exposure control, the marker will appear so that the target value for this automatic exposure control can be specified on the histogram. More specifically, in the present embodiment, a control target marker will appear which is identically shaped as but differently colored from the marker M described with reference to FIG. 4. Therefore, the GUI control section 63 moves the marker position indicating the target value on the histogram if the user changes this target value for automatic exposure control by operating the operator.

Further, if the brightness of the imaging result is insufficient under automatic aperture control or aperture control by manual operation based on the brightness determination result output from the camera picture control section 64, the histogram display is switched to notify the user that the brightness of the imaging result is insufficient. Here, in the present embodiment, the switching of the histogram display is accomplished by reducing the luminance level of the histogram display if the brightness of the imaging result is insufficient. It should be noted, in this case, that if the marker M indicating the luminance level of the zebra display and the control target value marker are displayed, the color of this marker will change, for example, to red.

If the operator 12 is operated in this condition, the imaging result will be recorded to a magnetic tape in the format specified by the user on the menu screen. Further the GUI control section 63, if the operator 30 to 34 for reproduction are operated, controls operations of each section in response to the operation of these operators 30 to 34, thereby reproducing the image result recorded to the magnetic tape to display the monitor image.

(2) Operation of Embodiment 1

In the camera-integrated video tape recorder 1 configured as described above, the imaging result obtained by the imaging element 61 is processed by the camera picture control section 64, after which the imaging result is displayed in the display section 19 and electronic viewfinder 3 via the baseband control section 68, and the monitor image of the imaging result is displayed (FIGS. 1 and 2). This imaging result is output to the tape deck control section 72 and recorded to a magnetic tape in response to the operation of the operator by the user. In response to the operation of the operators 30 to 34, on the other hand, the imaging result recorded on a magnetic tape is reproduced by the tape deck control section 72, sequentially processed by the coding/decoding section 71 and HDV codec 69 or processed by the DV codec 70, and fed to the baseband control section 68. Then, the monitor image is displayed in the display section 19 and electronic viewfinder 3.

When the imaging result recorded or reproduced as described above is processed by the camera picture control section 64 after being obtained by the imaging element 61, the brightness is detected by the camera drive control section 62. If the user specifies automatic exposure control, the optical system aperture and others will be controlled so that this brightness detection result serves as the target value. In contrast, if the user specifies manual operation, the imaging result is obtained at the aperture value commensurate with the operation of the operator 21 by the user.

Further, the luminance level of the imaging result is tallied by the camera picture control section 64 on a pixel-by-pixel basis to detect the luminance level distribution. When a histogram is displayed in response to a user instruction, the GUI control section 63 synthesizes histogram images based on the distribution detection result. The histogram resulting from this image synthesis is displayed in the display section 19 and electronic viewfinder 3.

Still further, the baseband control section 68 generates determination criteria according to the user specification of the zebra display and sequentially determines the luminance level based on the determination criteria to detect the region with the specific luminance level specified by the user. When the user specifies the zebra display, a monitor image of the imaging result will appear in which the region with the specific luminance level is converted into a specific pattern of diagonal stripes.

Therefore, the camera-integrated video tape recorder 1 according to the present embodiment permits verification of the aperture control status for filming of the desired subject using the histogram display and zebra display as needed as with conventional imaging devices.

That is, if, for example, a zoomed-up picture of a person is filmed under automatic exposure control, diagonal stripes are displayed in the region with a luminance level of 70[%] by the zebra display. This makes it possible to inspect for proper exposure by verifying that the person's face has been converted into diagonal stripes. Further, manual aperture control permits the aperture to be changed so that the person's face is converted into these diagonal stripes, thus making it possible to obtain the person's picture under proper exposure in the monitor image. Still further, if the region with a luminance level of 100[%] or above is marked with diagonal stripes, the whited-out portion can be readily distinguished.

On the other hand, when the histogram display is activated and if the distribution is skewed toward higher luminance levels, one can determine that the picture is rather whited out as a whole. In contrast, if the distribution is skewed toward lower luminance levels, one can determine that the picture is rather blacked out as a whole.

The present embodiment is configured to simultaneously activate both the zebra display and histogram display by the instruction by the user, thus providing the user with significantly more exposure control information than if the histogram display or zebra display is activated alone.

However, simple simultaneous activation of the histogram display and zebra display does not go beyond simply providing two exposure control verification methods and may, instead, confuse the user. Thus, so long as two verification methods are provided, the user's ease of use will probably improve further if more useful exposure control information can be provided by organically linking these two verification methods.

In the present embodiment, when the zebra display and histogram display are activated simultaneously, the marker M appears so that the luminance level of the region diagonally striped by the zebra display can be verified on the histogram 80 (FIG. 3(B)). As a result, the present embodiment can provide more useful exposure control information by organically linking the two exposure control verification methods, effectively avoiding user confusion.

That is, if, for example, the zebra display for the luminance level of 70[%] is activated, one can readily and reliably distinguish, in a visual manner, between the region with a luminance level of 70[%] or above and that with a luminance level below 70[%] in the imaging result by verifying the marker position on the histogram. As a result, an imaging result with higher definition can be obtained by finely adjusting the aperture according to the area of each region.

On the other hand, if, for example, the zebra display for the luminance level of 100[%] is activated, one can readily verify the area of the whited-out region. Also in this case, an imaging result with higher definition can be obtained by finely adjusting the aperture through this verification of the area.

Further, also in the present embodiment, this marker display can be changed according to the setting on the menu screen. This also provides improved ease of use for the user during verification using the marker.

In contrast, if the user selects automatic aperture control after specifying the display of a target value on the menu screen, a marker will appear so that the target value for exposure control, rather than the luminance level according to the zebra display, can be specified on the histogram.

That is, even if the desired subject is filmed under automatic exposure control, one may like to obtain an imaging result with some scenes rather dark and others rather light. In this case, the camera-integrated video tape recorder 1 changes the target value for automatic exposure control. Practically, however, unless one is experienced to a certain extent, one cannot accurately understand how much the brightness of the imaging result changes with change of the target value.

However, if a marker is displayed so that the target value for exposure control can be specified on the histogram as in the present embodiment, one can understand how much the brightness of the imaging result changes with change of the target value for automatic exposure control, for example, by one step more easily than in the prior art. Therefore, the present embodiment makes it possible to obtain an imaging result at the intended brightness, thus providing higher definition in the imaging result.

Further, in the automatic exposure control and manual exposure control, in the event of insufficient brightness of the imaging result, the color of the histogram display changes, notifying the user of insufficient light intensity and proactively avoiding failed filming by means of a simple configuration.

(3) Effects of Embodiment 1

According to the aforementioned configuration, the marker appears so that the luminance level, converted into a specific pattern by the zebra display, can be specified on a histogram, thus avoiding user confusion and providing the user with useful information resulting from simultaneous activation of the histogram display and zebra display.

Further, this specific luminance level is changed according to a user instruction. This makes it possible to verify the imaging result in various manners as necessary.

Still further, the marker display is changed according to a user instruction. This provides improved ease of use for the user.

Still further, the target value marker is displayed so that the target value for automatic exposure control can be specified on the histogram. This makes it possible to verify the brightness of the imaging result after the change in aperture ever more easily, thus providing further improved ease of use.

That is, it is ever easier to verify the brightness of the imaging result of the case in which the target value is changed variously and the target value is changed by changing target value according to a user instruction, thus delivering ever greater ease of use.

Further, if the brightness of the imaging result does not meet a predetermined criterion, the histogram display color changes. This notifies the user of insufficient light intensity and proactively avoids failed filming by means of a simple configuration.

(4) Other Embodiments

Figure 5:
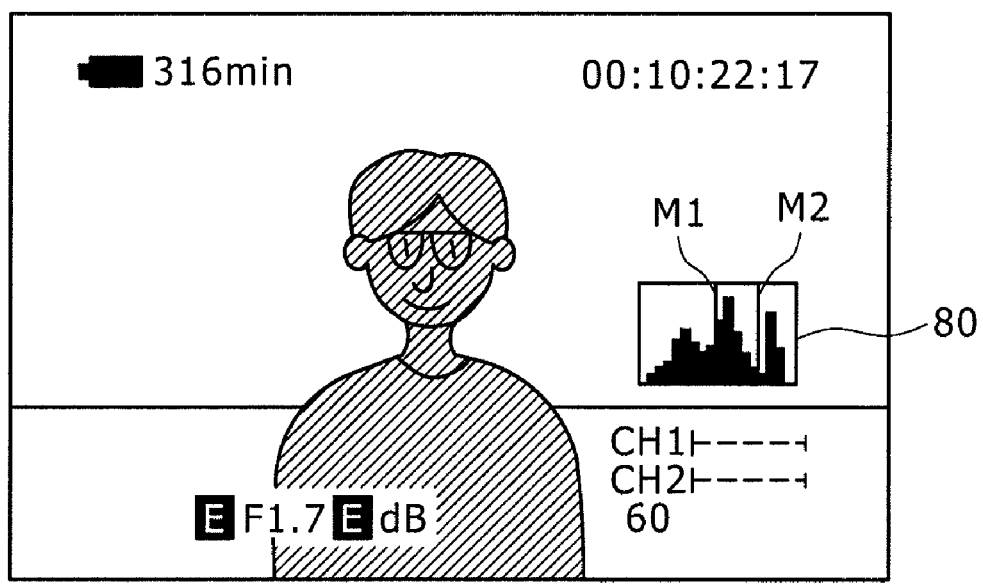
FIG. 5 is a plan view illustrating the display of the display section in the camera-integrated video tape recorder according to another embodiment.

In the aforementioned embodiment, a description has been given of the case in which the marker is displayed so that the center or lower limit luminance level of the region to be indicated by the zebra display can be verified. However, the present invention is not limited thereto. For example, the lower and upper limit luminance levels of the region to be indicated by the zebra display may be indicated by markers M1 and M2 as illustrated in FIG. 5.

Further, in the aforementioned embodiment, a description has been given of the case in which one marker for a specific luminance level to be indicated by the zebra display and another marker for the target value for automatic exposure control are selectively displayed. However, the present invention is not limited thereto. These markers, distinguishable from each other by color, for example, may be displayed simultaneously.

Still further, in the aforementioned embodiment, a description has been given of the case in which a marker in line form is displayed. However, the present invention is not limited thereto. Markers in various forms may be widely used.

Still further, in the aforementioned embodiment, a description has been given of the case in which the present invention is applied to a camera-integrated video tape recorder. However, the present invention is not limited thereto, but widely applicable to various imaging devices adapted to film moving and still images.

INDUSTRIAL APPLICABILITY

The present invention is applicable, for example, to a camera-integrated video tape recorder.

EXPLANATION OF REFERENCE SYMBOLS

1: CAMERA-INTEGRATED VIDEO TAPE RECORDER
3: ELECTRONIC VIEWFINDER
4: BATTERY
5 TO 15, 20 TO 51: OPERATORS
18: DOOR
19: DISPLAY SECTION
61: IMAGING ELEMENT
62: CAMERA DRIVE CONTROL SECTION
63: GUI CONTROL SECTION
64: CAMERA PICTURE CONTROL SECTION
65: MICROPHONE
66: INPUT/OUTPUT CIRCUIT
67: AD/DA CIRCUIT
68: BASEDBAND CONTROL SECTION
69: HDV CODEC
70: DV CODEC
71: CODING/DECODING SECTION
72: TAPE DECK CONTROL SECTION
73: MECHANICAL DRIVE CONTROL SECTION
74: LINK CONTROL SECTION
80: HISTOGRAM
M, M1, M2: MARKERS

The invention claimed is:

1. An imaging device comprising:
an imaging section to obtain an imaging result;
a display section to display a monitor image of the imaging result;
a luminance distribution detection section to detect the luminance distribution of the imaging result;
a luminance level determination section to determine the luminance levels of the imaging result; and
a control section to display, in the display section, a histogram showing the luminance distribution of the imaging result based on the detection result of the luminance level detection section, and display a marker at a specific luminance level specified in advance by a user before display of the histogram,
the control section also to convert, based on the determination result of the luminance level determination section, a region of the imaging result having the specific luminance level into a specific pattern in response to the displaying of the marker at the specific luminance level specified in advance by the user and to display the monitor image in the display section,
wherein the control section displays the marker so that the specific luminance level can be specified on the histogram.

2. The imaging device of claim 1, wherein the control section changes the specific luminance level according to a user instruction.

3. The imaging device of claim 1, wherein the control section changes the marker display according to a user instruction.

4. The imaging device of claim 1 comprising:
an aperture control section to detect the brightness of the imaging result and automatically control the aperture of the imaging section so that the brightness detection result matches a predetermined target value,
wherein the control section displays a target value marker according to a user instruction so that the target value can be specified on the histogram.

5. The imaging device of claim 4, wherein the aperture control section changes the target value according to a user instruction.

6. The imaging device of claim 1, wherein the control section changes a histogram display color when a brightness of the imaging result does not meet a predetermined criterion.

7. An imaging device control method for displaying an imaging result obtained by an imaging section, the control method comprising:
a luminance distribution detection step for detecting the luminance distribution of the imaging result;
a luminance level determination step for determining the luminance levels of the imaging result; and
a display step of displaying, in the display section, a histogram showing the luminance distribution of the imaging result based on the detection result of the luminance level detection section, and display a marker at a specific luminance level specified in advance by a user before display of the histogram, and converting, based on the determination result of the luminance level determination step, a region of the monitor result having the specific luminance level into a specific pattern in response to the displaying of the marker at the specific luminance level specified in advance by the user and displaying the monitor image in the display section, wherein the display step displays the marker so that the specific luminance level can be specified on the histogram.

8. A non-transitory computer-readable storage medium having stored thereon a program for an imaging device control method for displaying an imaging result obtained by an imaging section, the control method comprising:

a luminance distribution detection step for detecting the luminance distribution of the imaging result;

a luminance level determination step for determining the luminance levels of the imaging result; and a display step of displaying, in a display section, a histogram showing the luminance distribution of the imaging result based on the detection result of the luminance level detection section, and display a marker at a specific luminance level specified in advance by a user before display of the histogram, and converting, based on the determination result of the luminance level determination step, a region of the monitor result having the specific luminance level into a specific pattern in response to the displaying of the marker at the specific luminance level specified in advance by the user and displaying the monitor image in the display section, wherein the display step displays the marker so that the specific luminance level can be specified on the histogram.

* * * * *